(12) United States Patent
Haszler et al.

(10) Patent No.: US 6,416,884 B1
(45) Date of Patent: Jul. 9, 2002

(54) ALUMINIUM-MAGNESIUM WELD FILLER ALLOY

(75) Inventors: Alfred Johann Peter Haszler, Vallendar (DE); Desikan Sampath, Beverwijk (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/463,780

(22) PCT Filed: Oct. 1, 1998

(86) PCT No.: PCT/EP98/06250
§ 371 (c)(1),
(2), (4) Date: Jun. 23, 2000

(87) PCT Pub. No.: WO99/17903
PCT Pub. Date: Apr. 15, 1999

Related U.S. Application Data

(63) Continuation-in-part of application No. 09/155,652, filed as application No. PCT/EP97/01623 on Oct. 1, 1998.

(30) Foreign Application Priority Data

Oct. 3, 1997 (DE) .......................................... 97203026

(51) Int. Cl.$^7$ .............................................. B32B 15/10
(52) U.S. Cl. ............... 428/654; 228/262.5; 228/262.51; 420/541; 420/543; 420/545
(58) Field of Search .................................. 420/541, 544, 420/543, 545; 148/440, 550; 228/262.5, 262.51; 428/654

(56) References Cited

U.S. PATENT DOCUMENTS

| | | | |
|---|---|---|---|
| 2,106,827 A | | 2/1938 | Brown |
| 5,908,518 A | * | 6/1999 | Hoffmann et al. .......... 148/440 |

FOREIGN PATENT DOCUMENTS

| | | |
|---|---|---|
| EP | 0799900 | 10/1997 |
| FR | 2264095 | 10/1975 |
| GB | 2000806 | 1/1979 |
| JP | 449091 | 4/1969 |
| JP | 5169290 | 7/1993 |

OTHER PUBLICATIONS

Patent Abstracts of Japan, vol. 012, No. 092, Mar. 25, 1988 & JP 62 224652, Oct. 2, 1987.

* cited by examiner

Primary Examiner—George Wyszomierski
Assistant Examiner—Janelle Combs-Morillo
(74) Attorney, Agent, or Firm—Stevens, Davis, Miller & Mosher, LLP

(57) ABSTRACT

The disclosure relates to an aluminium-base weld filler alloy having the following composition in weight percent: Mg 5.0–6.5, Mn 0.4–1.2, Zn 0.4–<2.0, Zr 0.05–0.3, Cr 0.3 max., Ti 0.2 max., Fe 0.5 max., Si 0.5 max., Cu 0.25 max., balance Al and inevitable impurities. Further, the disclosure relates to a method of manufacturing an aluminium-base weld wire, and to a method of constructing welded constructions.

13 Claims, No Drawings

ALUMINIUM-MAGNESIUM WELD FILLER ALLOY

This application is a Continuation-In-Part application of U.S. application Ser. No. 09/155,652, filed Feb. 24, 1999, now U.S. Pat. No. 6,238,495, which was filed on Feb. 24, 1999 and issued on May 29, 2001, which is the National Stage under 35 USC 271 of PCT application Serial No. PCT/EP97/01623.

FIELD OF THE INVENTION

The present invention relates to an aluminium-magnesium-base weld filler alloy, which is particularly suitable to be used in the construction of large welded structures such as storage containers and vessels for marine and land transportation. For example, the weld filler alloy of this invention can be used in the welded construction of marine transportation vessels such as catamarans of mono-hull type, fast ferries, high speed light craft. The weld filler alloy of the present invention can also be used in construction of numerous other structures such as LNG tanks, silos, tanker lorries, pressure vessels, bridges, and railway wagons. Further, the invention relates to a method of manufacturing an aluminium-base weld wire, and to a method of constructing welded constructions.

DESCRIPTION OF THE RELATED ART

Al—Mg-base weld filler alloys are extensively used in large welded constructions such as storage containers and vessels for land and marine transportation. One of the standard alloys is the AA5183 alloy having the nominal composition, in wt. %:

| | |
|---|---|
| Mg | 4.3–5.2 |
| Mn | 0.5–1.0 |
| Zn | 0.25 max. |
| Cr | 0.05–0.25 |
| Ti | 0.15 max. |
| Fe | 0.40 max. |
| Si | 0.40 max. |
| Cu | 0.10 max. |
| others | |
| (each) | 0.05 max. |
| (total) | 0.15 max. | balance aluminium.

In particular, AA 5183 weld wire is widely used in the welded construction of marine vessels such as ships, catamarans and high speed craft. The main reason for the versatility of the AA5183 alloy is that it provides good combinations of high strength, corrosion resistance, bendability and weldability. The strength of the weld joint of AA 5183 alloy can be increased without significant loss in ductility by increasing the Mg percentage in the alloy. However, increasing the % of Mg in Al—Mg-base weld filler alloys is accompanied by a drastic reduction in corrosion resistance.

Some other disclosures of Al—Mg alloys found in the prior art literature will be mentioned below.

The Japanese patent application no. JP-A-05169290 proposes a filler alloy containing, in wt. %:

| | |
|---|---|
| Zn | 1–6 |
| Mg | 3–6 (here, Zn ≦ Mg) |
| Mn | 0.2–0.9 |
| Cr | 0.05–0.5 |
| Ti | 0.05–0.2 |
| B | 0.01–0.2 |
| Zr | 0.05–0.2 | balance aluminium.

The proposed filler alloy is applied in welding techniques having a solidifying speed of higher than $1-3\times10^2$ °C./sec, and whereby Zr may be incorporated more than the quantity of the solid solution.

The British patent application GB-A-2000806 proposes a filler alloy, the composition of the filler alloy is, in wt. %:

up to 5.5% Mg 0.2–0.5% Cu balance essentially aluminium.

In the examples and in the sub-claims the composition is more restricted to:

| | |
|---|---|
| Zn | 1.0–4.0, preferably 2.7–3.3 |
| Mg | 2.0–5.0, preferably 3.7–4.3 |
| Cu | 0.2–0.5, preferably 0.25–0.35 |
| Mn | 0.3–2.5, preferably 0.35–0.45 |
| Ti | 0.05–0.2 |
| Cr | 0.05–0.3 |
| Zr | 0.05–0.2 |
| Si | less than 0.2 |
| Fe | less than 0.4 | balance aluminium.

In the examples the Cu addition is mentioned as compulsory. The filler alloy disclosed has been found suitable for welding constructional parts of AlZnMg alloys to themselves or to other aluminium alloys.

The European patent application EP-A-0799900 relates to an aluminium alloy in the form of plate or extrusion for large welded structures, with improved properties over those of standard AA5083 series. The composition of the proposed material is, in wt. %:

| | |
|---|---|
| Mg | 4.5–7.0 |
| Mn | 0.4–1.2 |
| Zn | 0.5–5.0 |
| Zr | 0.3 max. |
| Cr | 0.3 max. |
| Ti | 0.2 max. |
| Fe | 0.5 max. |
| Si | 0.5 max. |
| Cu | 0.4 max. | balance aluminium and inevitable impurities.

The patent application cited does not give any indication about the use as weld filler alloy and to the improvements over standard AA5183 filler alloy.

SUMMARY OF THE INVENTION

One object of the present invention is to provide an Al—Mg-base weld filler alloy with improved strength of welded aluminium alloy joints as compared to those of the standard filler alloys such as AA5183 alloy. It is also an object to provide Al—Mg base weld filler alloy which can offer ductility, bendability and corrosion resistance at least equivalent to those standard Al—Mg base weld wires, such as AA5356 and in particular AA5183.

According to the invention there is provided an aluminium-magnesium-base weld filler alloy, having the following composition in weight percent:

| | |
|---|---|
| Mg | 5.0–6.5 |
| Mn | 0.4–1.2 |
| Zn | 0.4–<2.0 |
| Zr | 0.05–0.3 |
| Cr | 0.3 max. |
| Ti | 0.2 max. |
| Fe | 0.5 max. |
| Si | 0.5 max. |
| Cu | 0.25 max. | balance Al and inevitable impurities.

By the invention we can provide welded aluminium joints having higher strength than the standard AA5183 welds. Weld filler alloys in accordance with the invention have been found very successful for the welding constructional parts of AlMg alloys to themselves or to other aluminium alloys. More particularly, very good results are obtained in the case where the weld filler alloy in accordance with the invention is applied for the welding of constructional parts of AlMg alloys, which AlMg alloys are within the same chemical compositional range as the inventive weld filler alloy.

Further it has been found that the higher Mg content in combination with the higher Zn content in comparison with standard AA5183 filler wire, has an increased freezing range, in the range of 568–639° C. for the weld filler alloy of this invention against 574–638° C. for standard AA5183 alloy. The advantages of this increased freezing range in particular emerge when the weld filler alloy of this invention is used when constructing welded constructions, e.g. a smooth transition from the weld bead to the base material, which reduces the notch effect and by this improving fatigue performance of joints. Further during fusion welding, at those places where the weld bead overlaps with the base material, surface oxides e.g. aluminium-oxides are present. The increased fluidity of the weld filler alloy of this invention leads to more adherence and hence reduces deleterious "overlap" effects. And additionally a relatively more flat bead and finer or smoother ripples on the surface of the weld seam is obtained.

It is believed that the improved properties available with the invention, particularly higher strength levels in the weld seam, results from increasing the levels of Mg and Mn, and adding Zr. The good corrosion resistance at higher Mg levels results from uniformly precipitating relatively less anodic Mg and Zn containing intermetallics in the microstructure of the weld seam.

The reasons for the limitations of the alloying elements of the aluminium base weld filler alloy according to the present invention are described below. All composition percentages are by weight.

Mg: Mg is the primary strengthening element in the weld filler alloy. Mg levels below 5.0% do not provide the required strength to the weld seam and when the addition exceeds 6.5%, manufacturing weld wires from the weld filler alloy becomes immensely difficult. The manufacturing difficulty arises due to severe cracking during continuous or semi-continuous casting and subsequent processing. The preferred level of Mg is 5.0–6.0% as a compromise between ease of fabrication and strength.

Mn: Mn is an essential additive element. In combination with Mg, Mn provides the strength to the welded joints. Mn levels below 0.6% cannot provide sufficient strength to the welded joints. Above 1.2% the manufacturing of feed stocks for subsequent wire drawing becomes extremely difficult. The preferred minimum for Mn is 0.7% for strength.

Zn: Zn is an importance additive for corrosion resistance of the weld seams. Zn also contributes to some extent to the strength of the weld seams. Below 0.4%, the Zn addition does not provide sufficient corrosion resistance equivalent to that of AA 5183 alloy welded joints. Due to weldability reasons, the Zn level is restricted to <2.0%. More preferably the Zn level is restricted to a maximum of 0.9%. In a further preferred embodiment the Mg/Zn-ratio is larger than 5 in order to achieve a favourable combination of strength and corrosion resistance properties.

Zr: Zr is important to achieving strength improvements in the weld seams. Zr is also important for resistance against cracking during welding. Zr levels above 0.3% results in very coarse needle shaped primary particles which cause unacceptable failures during wire drawing operation and therefore the Zr level must be kept below 0.3%.

Ti: Ti is important as a grain refiner during solidification of the welded seam. However, Ti in combination with Zr form undesirable, coarse primaries which can decrease the toughness and fatigue strength of the weld seams. To avoid this, Ti levels must be kept below 0.2% and the preferred range for Ti is 0.05–0.1%.

Fe: Fe forms compounds of Al—Fe—Mn during casting, thereby limiting the beneficial effects due to Mn. Fe levels above 0.5% causes coarse primary particles formation which decrease the fatigue life of the welded joints of the weld filler alloy of the current invention. The preferred range for Fe is 0.10–0.30%.

Si: Si forms $Mg_2Si$ which is practically insoluble in Al—Mg alloys containing Mg>4.5%. Therefore Si limits the beneficial effects of Mg. Si also combines with Fe to form coarse AlFeSi particles which can affect the fatigue life of the welded joints of a welded construction. To avoid the loss in primary strengthening element Mg, the Si level must be kept below 0.5%. The preferred range for Si is 0.10–0.30%.

Cr: Cr improves the corrosion resistance of the alloy. However, Cr limits the solubility of Mn and Zr. Therefore, to avoid formation of coarse primaries, the Cr level must be kept below 0.3%. A preferred range for Cr is 0–0.15%.

Cu: Cu should be kept below 0.25%. Cu levels above 0.25% gives rise to unacceptable deterioration in pitting corrosion resistance of the weld filler alloy of the current invention. The preferred level for Cu is <0.10%, and more preferably the Cu is present at impurity level <0.05%.

The balance is Al and inevitable impurities. Typically each impurity element is present at 0.05% maximum and the total of impurities is 0.15% maximum. With regard to impurities content, it is preferable to limit the beryllium content to about 0.00008%.

The weld filler alloy of the present invention is most preferably provided in the form of drawn wire. The wire may be produced, for example, by extruding the alloy in accordance with the invention through a multiple hole die at a temperature range of 200–550° C. and a ram speed in a range of 1–25 m/min. The extruded rod may then be drawn into wire using multiple drawing steps. Extrusion ratios typically used to draw aluminium wire may be employed. During the wire drawing operation intermediate annealing of the alloy in a temperature in the range of 250–550° C. may be employed. The drawn wire may then be final annealed, if required, in a temperature range of 250–550° C. Each annealing step may have a soak period in the range 10 min. to 10 hours. The diameter of the finished drawn wire is typically in a range of 0.6–6.0 mm. The wire may also be produced by continuously casting the alloy in the form, for example, of a round bar. The bars may be either directly coiled or after a rolling step, and then subsequently drawn to produce weld filler wire.

The invention also consists of a method of constructing welded construction, such as a storage container or a vessel for marine or land transportation, comprising the steps of (a) providing separate component parts of the construction; and
(b) welding the separate parts together with an aluminium-base weld filler alloy in accordance with the features set out above.

Preferably the component parts of the construction are provided in the form of an extrusion, plate, sheet or a combination thereof.

It has been found that by using the weld filler alloy in accordance with this invention there is a smooth transition from the weld bead to the base material as compared to standard AA5183 filler wire and this reduces the notch effect and, thus, improves fatigue performance of the obtained joints. Further it has been found that the increased freezing range of the weld filler alloy leads to more adherence and hence reduces deleterious "overlap" effects. And additionally it has been found that as compared to standard AA5183 filler wire a more flat bead and finer and/or smoother ripples on the surface of the weld seam is obtained.

EXAMPLES

Example 1

Two DC-cast extrusion ingot of the weld filler alloy in accordance with the invention, see Table 1 with compositions in weight percent, has been extruded to produce round bar extrusions of diameter of 9.5 mm. Standard direct extrusion process was used to produce the feed stocks for the subsequent wire drawing operation. One batch of each weld filler alloy of the extruded rods were further drawn to produce filler wires with diameters 1.2, 1.6, 3.2, 4.0 mm respectively corresponding to the standard diameter of filler wires for MIG welding. Another batch of each weld filler alloy was further processed to produce wires with diameters 1.5, 2.0, 2.5, 3.2, 5.0, 6.0 and 8.0 mm respectively corresponding to the standard diameters for the TIG welding process. The wire drawing comprised series of drawing and intermediate annealing at 380° C. For reference purposes the standard weld filler alloy AA5183, see Table 1, was used in this example.

Using the filler wires of 1.2 mm diameter standard MIG welded panels of 1000×1000×8 mm (length×width×thickness of the base material) were prepared. The chemistries of the plate or base materials used are also listed in Table 1, and all the plate materials were in the H321-temper. The composition of Plate-A represents a typical AA5083 alloy.

From the welded panels, samples for tensile testing and corrosion testing were prepared. The tensile properties of the welded panels were determined using standard tensile test. Resistance to pitting and exfoliation corrosion of the panels were assessed with ASSET test according to ASTM G66, whereas the resistance to SCC was assessed using four point bend test following ASTM G39 procedures.

Table 2 lists the tensile test results over 3 or 4 testing per combination. From these results it can be seen that the tensile properties of the plate material in the welded condition are significantly improved when the weld filler wire alloy in accordance with this invention is used instead of the filler alloy according to AA5183. The best results are obtained when the weld filler wire in accordance with the invention is used in combination with the plate material which is also within the same chemical window as is the inventive weld filler wire alloy.

Table 3 lists the ASSET testing results. The testing results N represent no corrosion attack, P represents pitting with grades from A to D indicating worsening degree of resistance to corrosion. From Table 3 it can be seen that that the corrosion resistance of the panels in the welded condition using the filler wire in accordance with this invention are either comparable or better than the standard filler alloy. Independent of the combination used, samples from all the combinations passed 1000 hours of testing in the SCC test according to ASTM G39 procedure. From this it can be seen that the increased strength of the welded panels did not cause deterioration in stress corrosion resistance.

Example 2

In an identical manner as in Example 1 material was welded using a double sided TIG process. For this process 4 mm diameter filler wire alloy was used. The resultant tensile properties are listed in Table 4.

From the results of Table 4, it can be seen that the welded panel produced using base material/filler wire combination plate-B/filler-1 invention is significantly stronger than plate-A/filler AA5183 which is the reference combination of AA5083 alloy with the currently widely used filler wire alloy AA5183.

TABLE 1

|  | Mg | Mn | Zn | Zr | Cu | Cr | Fe | Si | Ti | Al |
| --- | --- | --- | --- | --- | --- | --- | --- | --- | --- | --- |
| Filler-1 invention | 5.30 | 0.84 | 0.55 | 0.13 | 0.013 | 0.049 | 0.19 | 0.11 | 0.015 | bal. |
| Filler-2 invention | 5.89 | 0.82 | 0.50 | 0.12 | 0.01 | 0.07 | 0.21 | 0.07 | 0.08 | bal. |
| Filler AA5183 | 4.60 | 0.68 | 0.01 | — | 0.04 | 0.08 | 0.33 | 0.15 | 0.01 | bal. |
| Plate-A | 4.82 | 0.65 | 0.09 | 0.01 | 0.03 | 0.07 | 0.15 | 0.09 | 0.10 | bal. |
| Plate-B | 5.30 | 0.84 | 0.55 | 0.13 | 0.013 | 0.049 | 0.19 | 0.11 | 0.015 | bal. |

TABLE 2

| Combination | | 0.2% PS (MPa) | UTS (MPa) | Elongation (%) |
| --- | --- | --- | --- | --- |
| Plate-A | Filler AA5183 | 125 | 275 | 15.2 |
|  |  | 127 | 282 | 15.4 |
|  |  | 130 | 277 | 17.1 |
|  |  | 128 | 274 | 14.5 |
| Plate-A | filler invention | 141 | 297 | 14.6 |
|  |  | 142 | 296 | 13.9 |
|  |  | 140 | 301 | 14.3 |
|  |  | 145 | 305 | 11.1 |

TABLE 2-continued

| Combination | | 0.2% PS (MPa) | UTS (MPa) | Elongation (%) |
|---|---|---|---|---|
| Plate-B | filler AA5183 | 160 | 310 | 15.2 |
| | | 165 | 312 | 16.2 |
| | | 162 | 317 | 13.3 |
| | | 164 | 320 | 16.4 |
| Plate-B | filler-1 invention | 170 | 319 | 15.7 |
| | | 172 | 325 | 14.2 |
| | | 174 | 324 | 11.6 |
| | | 171 | 331 | 10.9 |
| Plate-B | filler-2 invention | 180 | 341 | 16.2 |
| | | 177 | 345 | 14.7 |
| | | 181 | 340 | 15.9 |

TABLE 3

| Combination | Base Material | Heat affected Zone | Weld Seam |
|---|---|---|---|
| Plate-A/filler AA5183 | PB/PC | N | N |
| Plate-A/filler-1 invention | PB | N | N |
| Plate-B/filler AA5183 | N | N | N |
| Plate-B/filler-1 invention | N | N | N |
| Plate-B/filler-2 invention | N | N | N |

TABLE 4

| Combination | 0.2% PS (MPa) | UTS (MPa) | Elongation (%) |
|---|---|---|---|
| Plate-A/filler AA5183 | 125 | 275 | 15.2 |
| | 127 | 282 | 15.4 |
| Plate-B/filler-1 invention | 130 | 277 | 17.1 |
| | 168 | 330 | 16.2 |
| | 170 | 335 | 16.5 |

What is claimed is:

1. A method for constructing welded construction, comprising the steps of:
   (a) providing separate component parts of the construction; and
   (b) welding the separate parts together with an aluminium-base weld filler alloy in the form of a weld wire, wherein each of the separate component parts welded together with the aluminium-base weld filler alloy and the weld wire respectively have the following composition in weight percent:

| | |
|---|---|
| Mg | 5.0–6.0 |
| Mn | 0.7–1.2 |
| Zn | 0.4–0.9 |
| Zr | 0.05–0.3 |
| Cr | 0.15 max. |
| Ti | 0.2 max. |
| Fe | 0.5 max. |
| Si | 0.5 max. |
| Cu | 0.25 max. | balance aluminium and inevitable impurities.

2. A method according to claim 1 wherein the component parts of the construction are provided in the form of an extrusion, plate, sheet or a combination thereof.

3. A method according to claim, wherein the alloy has an Mg/Zn-ratio larger than 5.

4. A method according to claim 1, wherein the Ti content is 0.05–0.1%.

5. A method according to claim 1, wherein the Fe content is 0.10–0.30%.

6. A method according to claim 1, wherein the Si content is 0.10–0.30%.

7. A method according to claim 1, wherein the Cu content is 0.05% max.

8. A method according to claim 7, wherein each impurity is present at 0.05% maximum and the total of impurities is 0.15% maximum.

9. A method according to claim 8, wherein each of the separate component parts welded together with the aluminium-base weld filler alloy and the weld wire respectively has a beryllium content of at most about 0.00008%.

10. A method according to claim 1, wherein the Zn content is 0.5 to 0.9 wt. %.

11. A method according to claim 10, wherein the Zr content is 0.12 to 0.3 wt. %.

12. A method for constructing welded construction, comprising the steps of:
    (a) providing separate component parts of the construction; and
    (b) welding the separate parts together with an aluminium-base weld filler alloy in the form of a weld wire, wherein each of the separate component parts welded together with the aluminium-base weld filler alloy and the weld wire respectively consist of, in weight percent:

| | |
|---|---|
| Mg | 5.0–6.0 |
| Mn | 0.7–1.2 |
| Zn | 0.4–0.9 |
| Zr | 0.05–0.3 |
| Cr | 0.15 max. |
| Ti | 0.2 max. |
| Fe | 0.5 max. |
| Si | 0.5 max. |
| Cu | 0.25 max. | balance aluminium and inevitable impurities.

13. A welded structure comprising
    components welded together with an aluminium-base weld filler alloy from a weld filler wire, wherein the components and the weld filler wire comprise, in weight percent:

| | |
|---|---|
| Mg | 5.0–6.0 |
| Mn | 0.7–1.2 |
| Zn | 0.4–0.9 |
| Zr | 0.05–0.3 |
| Cr | 0.15 max. |
| Ti | 0.2 max. |
| Fe | 0.5 max. |
| Si | 0.5 max. |
| Cu | 0.25 max. | balance aluminium and inevitable impurities.

* * * * *